United States Patent
Yang et al.

(10) Patent No.: US 9,763,158 B2
(45) Date of Patent: Sep. 12, 2017

(54) BASE STATION IDENTITY CODE AND SYSTEM INFORMATION COLLECTION

(71) Applicant: QUALCOMM Incorporated, San Diego, CA (US)

(72) Inventors: Ming Yang, San Diego, CA (US); Tom Chin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 121 days.

(21) Appl. No.: 14/995,192

(22) Filed: Jan. 13, 2016

(65) Prior Publication Data

US 2017/0201923 A1    Jul. 13, 2017

(51) Int. Cl.
| | |
|---|---|
| H04L 12/50 | (2006.01) |
| H04W 36/24 | (2009.01) |
| H04W 36/00 | (2009.01) |
| H04L 12/26 | (2006.01) |

(52) U.S. Cl.
CPC ........... *H04W 36/245* (2013.01); *H04L 43/16* (2013.01); *H04W 36/0061* (2013.01)

(58) Field of Classification Search
CPC ....................................................... H04L 12/50
USPC .......................................................... 370/331
See application file for complete search history.

(56) References Cited

U.S. PATENT DOCUMENTS

| | | | |
|---|---|---|---|
| 8,903,383 B2 | 12/2014 | Farnsworth et al. | |
| 9,031,563 B2 | 5/2015 | Gupta et al. | |
| 2009/0156210 A1 | 6/2009 | Ponce De Leon et al. | |
| 2014/0161116 A1 | 6/2014 | Das et al. | |
| 2014/0213261 A1 | 7/2014 | Das et al. | |
| 2015/0003410 A1 | 1/2015 | Yang et al. | |
| 2015/0072685 A1 | 3/2015 | Chuang | |
| 2015/0148039 A1 | 5/2015 | Yang et al. | |
| 2015/0282018 A1 | 10/2015 | Melin et al. | |
| 2017/0142592 A1* | 5/2017 | Fischer | H04W 16/14 |

OTHER PUBLICATIONS

International Search Report and Written Opinion—PCT/US2017/013368—ISA/EPO—dated Mar. 14, 2017.

* cited by examiner

*Primary Examiner* — Dang Ton
(74) *Attorney, Agent, or Firm* — Seyfarth Shaw LLP

(57) ABSTRACT

A user equipment (UE) speeds up circuit switched fallback call establishment and reduces circuit switched fallback call establishment failure. In one instance, the UE receives a redirection command including a list of current neighbor cells/frequencies. The UE determines whether a current serving cell matches a previous serving cell stored in the UE. The UE also evaluates the list of current neighbor cells to determine whether each current neighbor cell matches a previous neighbor cell associated with the previous serving cell. The UE then determines neighbor cells for power scan and/or synchronization channel decoding procedures to select one of the current neighbor cells to redirect the UE based on the previously recorded type of redirection result.

26 Claims, 11 Drawing Sheets

BASE STATION IDENTITY CODE AND SYSTEM INFORMATION COLLECTION

BACKGROUND

Field

Aspects of the present disclosure relate generally to wireless communication systems, and more particularly, to determining neighbor cells for power scan, synchronization channel decoding procedures and/or system information collection.

Background

Wireless communication networks are widely deployed to provide various communication services, such as telephony, video, data, messaging, broadcasts, and so on. Such networks, which are usually multiple access networks, support communications for multiple users by sharing the available network resources. One example of such a network is the universal terrestrial radio access network (UTRAN). The UTRAN is the radio access network (RAN) defined as a part of the universal mobile telecommunications system (UMTS), a third generation (3G) mobile phone technology supported by the 3rd Generation Partnership Project (3GPP). The UMTS, which is the successor to global system for mobile communications (GSM) technologies, currently supports various air interface standards, such as wideband-code division multiple access (W-CDMA), time division-code division multiple access (TD-CDMA), and time division-synchronous code division multiple access (TD-SCDMA). For example, China employs TD-SCDMA as the underlying air interface in the UTRAN architecture with its existing GSM infrastructure as the core network. The UMTS also supports enhanced 3G data communications protocols, such as high speed packet access (HSPA), which provides higher data transfer speeds and capacity to associated UMTS networks. HSPA is a collection of two mobile telephony protocols, high speed downlink packet access (HSDPA) and high speed uplink packet access (HSUPA) that extends and improves the performance of existing wideband protocols.

As the demand for mobile broadband access continues to increase, research and development continue to advance the UMTS technologies not only to meet the growing demand for mobile broadband access, but also to advance and enhance the user experience with mobile communications.

SUMMARY

According to one aspect of the present disclosure, a method of wireless communication includes receiving a redirection command from a serving cell of a serving RAT (radio access technology). The redirection command includes a list of current neighbor frequencies corresponding to current neighbor cells of a neighbor RAT. The method also includes determining whether a cell identification for the serving cell and a stored serving cell identification of a previous serving cell are matched. The previous serving cell is associated with previous neighbor frequencies corresponding to previous neighbor cells. The previous neighbor cells are associated with previously recorded types of redirection results. The method also includes evaluating the list of current neighbor frequencies to determine whether each current neighbor cell matches a previous neighbor cell. The method further includes determining current neighbor cells for power scan and/or synchronization channel decoding procedures to select one of the current neighbor cells to redirect a UE (user equipment) based on the previously recorded types of redirection results.

According to another aspect of the present disclosure, an apparatus for wireless communication includes means for receiving a redirection command from a serving cell of a serving RAT (radio access technology). The redirection command includes a list of current neighbor frequencies corresponding to current neighbor cells of a neighbor RAT. The apparatus may also include means for determining whether a cell identification for the serving cell and a stored serving cell identification of a previous serving cell are matched. The previous serving cell is associated with previous neighbor frequencies corresponding to previous neighbor cells. The previous neighbor cells are associated with previously recorded types of redirection results. The apparatus may also include means for evaluating the list of current neighbor frequencies to determine whether each current neighbor cell matches a previous neighbor cell. The apparatus further includes means for determining current neighbor cells for power scan and/or synchronization channel decoding procedures to select one of the current neighbor cells to redirect a UE (user equipment) based on the previously recorded types of redirection results.

Another aspect discloses an apparatus for wireless communication and includes a memory and at least one processor coupled to the memory. The processor(s) is configured to receive a redirection command from a serving cell of a serving RAT (radio access technology). The redirection command includes a list of current neighbor frequencies corresponding to current neighbor cells of a neighbor RAT. The processor(s) is also configured to determine whether a cell identification for the serving cell and a stored serving cell identification of a previous serving cell are matched. The previous serving cell is associated with previous neighbor frequencies corresponding to previous neighbor cells. The previous neighbor cells are associated with previously recorded types of redirection results. The processor(s) is also configured to evaluate the list of current neighbor frequencies to determine whether each current neighbor cell matches a previous neighbor cell. The processor(s) is further configured to determine current neighbor cells for power scan and/or synchronization channel decoding procedures to select one of the current neighbor cells to redirect a UE (user equipment) based on the previously recorded types of redirection results.

Yet another aspect discloses a computer program product for wireless communications in a wireless network having a non-transitory computer-readable medium. The computer-readable medium has non-transitory program code recorded thereon which, when executed by the processor(s), causes the processor(s) to receive a redirection command from a serving cell of a serving RAT (radio access technology). The redirection command includes a list of current neighbor frequencies corresponding to current neighbor cells of a neighbor RAT. The program code also causes the processor(s) to determine whether a cell identification for the serving cell and a stored serving cell identification of a previous serving cell are matched. The previous serving cell is associated with previous neighbor frequencies corresponding to previous neighbor cells. The previous neighbor cells are associated with previously recorded types of redirection results. The program code further causes the processor(s) to evaluate the list of current neighbor frequencies to determine whether each current neighbor cell matches a previous neighbor cell. The program code further causes the processor(s) to determine current neighbor cells for power scan and/or synchronization channel decoding procedures to select one of the current neighbor cells to redirect a UE (user equipment) based on the previously recorded types of redirection results.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
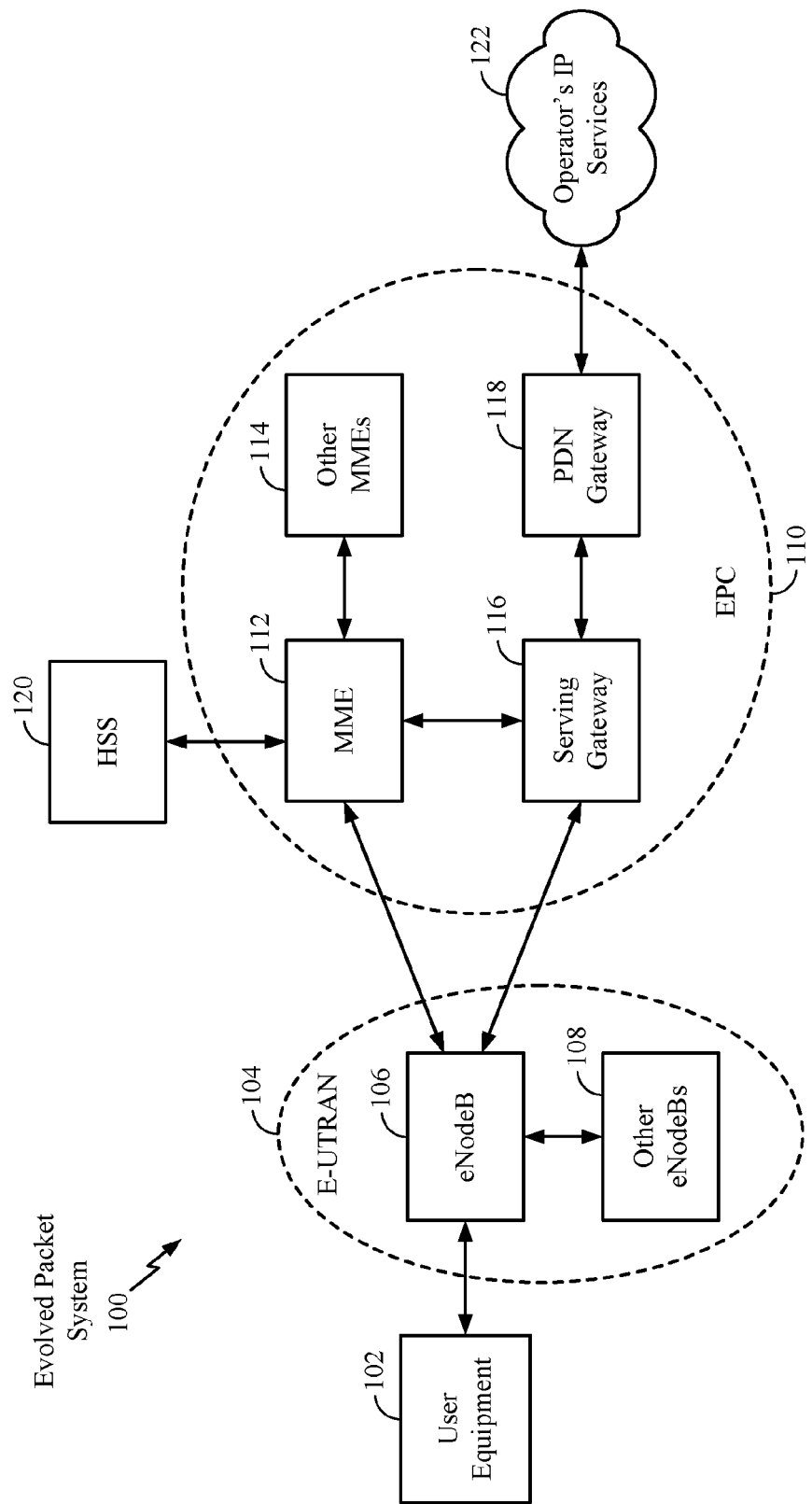
FIG. 1 is a diagram illustrating an example of a network architecture.

FIG. 1 is a diagram illustrating a network architecture 100 of a long term evolution (LTE) network. The LTE network architecture 100 may be referred to as an evolved packet system (EPS) 100. The EPS 100 may include one or more user equipment (UE) 102, an evolved UMTS terrestrial radio access network (E-UTRAN) 104, an evolved packet core (EPC) 110, a home subscriber server (HSS) 120, and an operator's IP services 122. The EPS can interconnect with other access networks, but for simplicity those entities/interfaces are not shown. As shown, the EPS 100 provides packet-switched services, however, as those skilled in the art will readily appreciate, the various concepts presented throughout this disclosure may be extended to networks providing circuit-switched services.

The E-UTRAN 104 includes an evolved NodeB (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a notebook, a netbook, a smartbook, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station or apparatus, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a mobility management entity (MME) 112, other MMEs 114, a serving gateway 116, and a packet data network (PDN) gateway 118. The MME 112 is the control node that processes the signaling between the UE 102 and the EPC 110. Generally, the MME 112 provides bearer and connection management. All user IP packets are transferred through the serving gateway 116, which itself is connected to the PDN gateway 118. The PDN gateway 118 provides UE IP address allocation as well as other functions. The PDN gateway 118 is connected to the operator's IP services 122. The operator's IP services 122 may include the Internet, the Intranet, an IP multimedia subsystem (IMS), and a PS streaming service (PSS).

Figure 2:
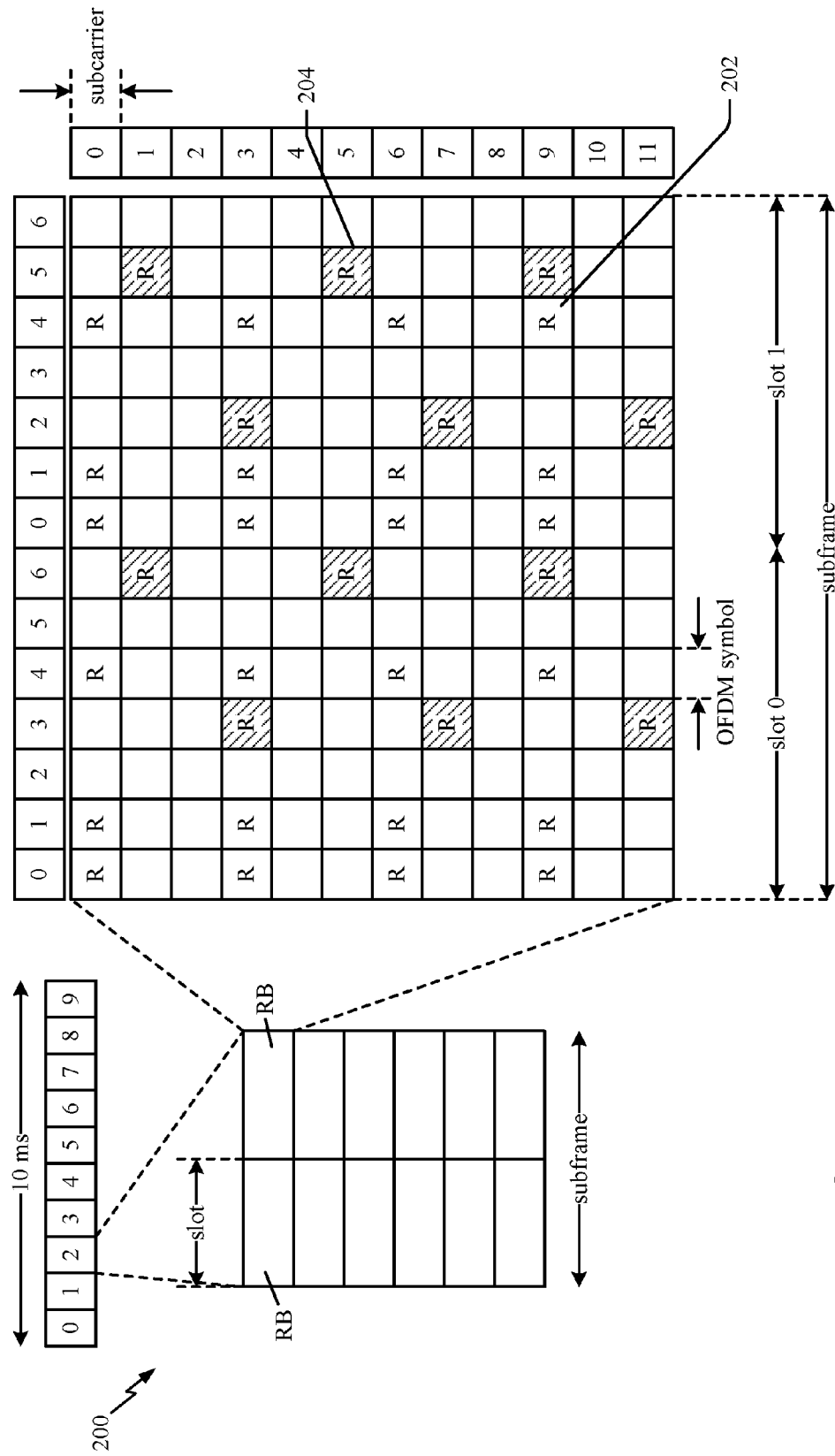
FIG. 2 is a diagram illustrating an example of a downlink frame structure in long term evolution (LTE).

FIG. 2 is a diagram 200 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each orthogonal frequency-division multiplexing (OFDM) symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 202, 204, include downlink reference signals (DL-RS). The DL-RS include Cell-specific RS (CRS) (also sometimes called common RS) 202 and UE-specific RS (UE-RS) 204. UE-RS 204 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 3:
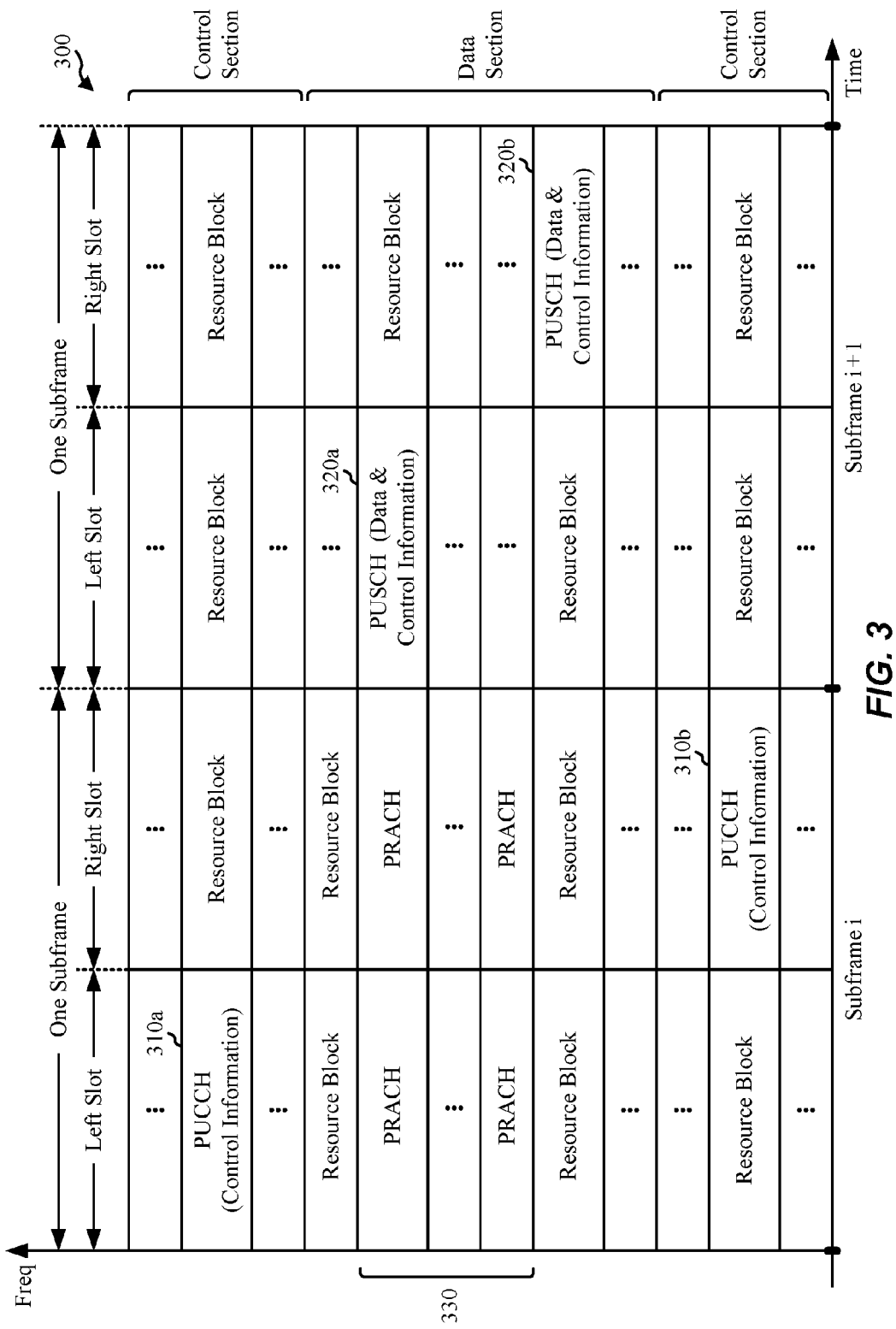
FIG. 3 is a diagram illustrating an example of an uplink frame structure in LTE.

FIG. 3 is a diagram 300 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 310a, 310b in the control section to transmit control information to an eNodeB. The UE may also be assigned resource blocks 320a, 320b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 330. The PRACH 330 carries a random sequence and cannot carry any uplink data/signaling. In network communications, a preamble is a signal used between two or more systems to synchronize transmission timing. The physical random-access channel (PRACH) is the time-frequency resource on which the random-access preamble is transmitted. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms). For example, in the random access procedure, a first step is to transmit a random access preamble to indicate a random-access attempt to a base station. The random access preamble allows the base station to estimate the delay between the terminal and the eNodeB. The estimate of the delay may be used in a second step to adjust uplink timing.

Figure 4:
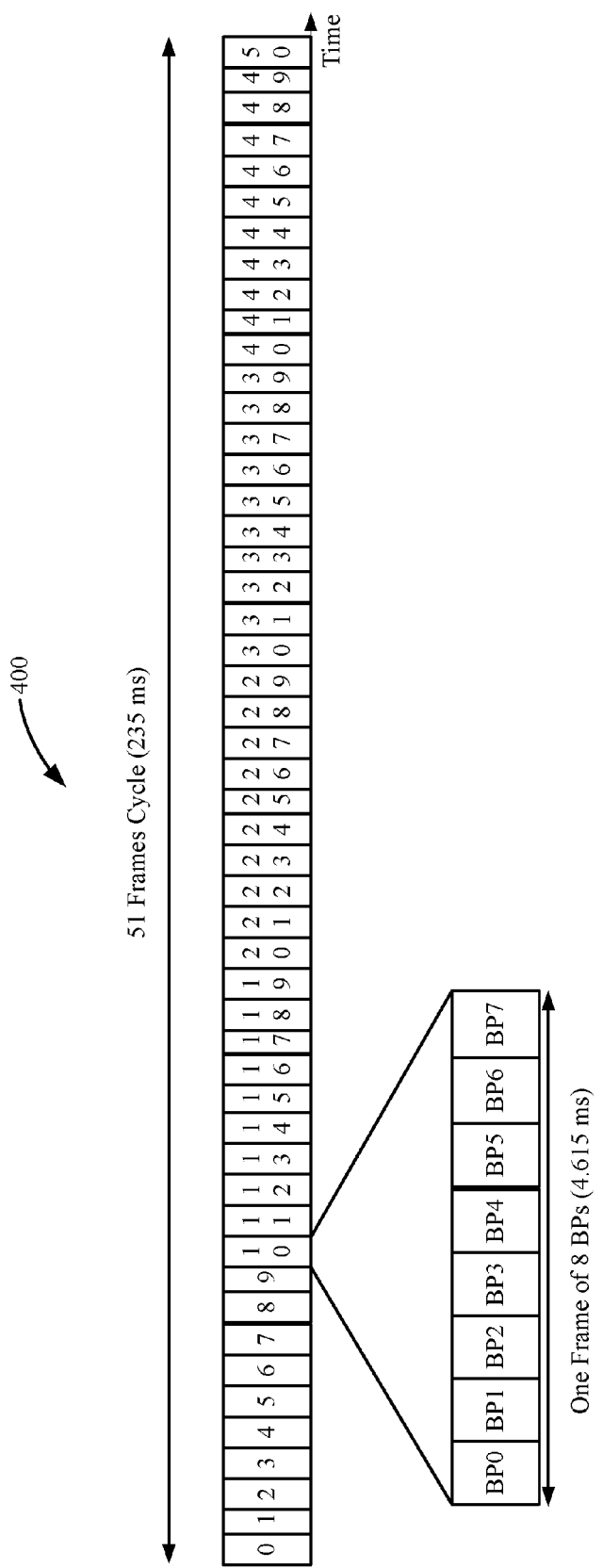
FIG. 4 is a block diagram illustrating an example of a global system for mobile communications (GSM) frame structure.

FIG. 4 is a block diagram illustrating an example of a GSM frame structure 400. The GSM frame structure 400 includes fifty-one frame cycles for a total duration of 235 ms. Each frame of the GSM frame structure 400 may have a frame length of 4.615 ms and may include eight burst periods, BP0-BP7.

Figure 5:
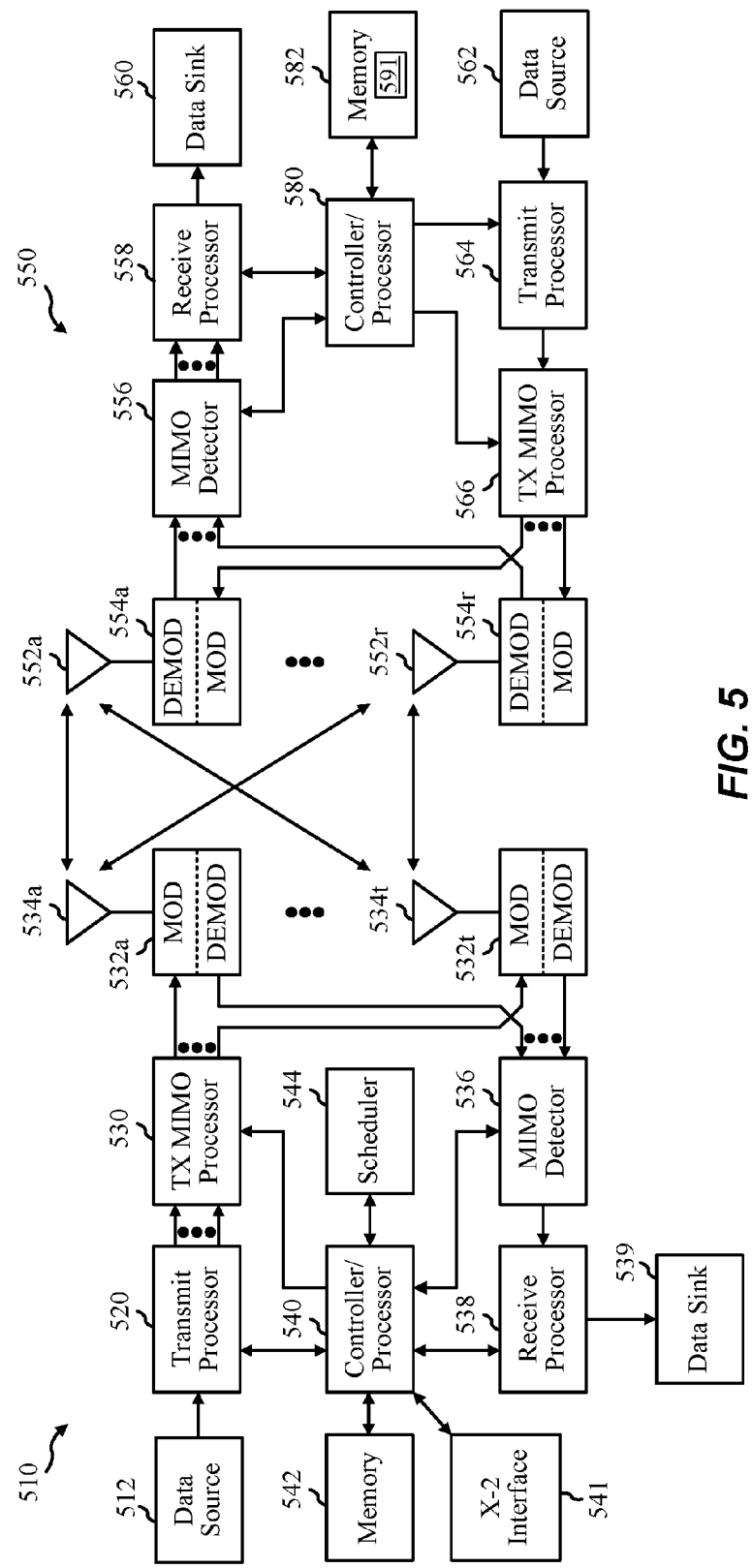
FIG. 5 is a block diagram conceptually illustrating an example of a base station in communication with a user equipment (UE) in a telecommunications system.

FIG. 5 is a block diagram of a base station (e.g., eNodeB or nodeB) 510 in communication with a UE 550 in an access network. In the downlink, upper layer packets from the core network are provided to a controller/processor 580. The base station 510 may be equipped with antennas 534a through 534t, and the UE 550 may be equipped with antennas 552a through 552r.

At the base station 510, a transmit processor 520 may receive data from a data source 512 and control information from a controller/processor 540. The control information may be for the physical broadcast channel (PBCH), physical control format indicator channel (PCFICH), physical hybrid ARQ indicator channel (PHICH), physical downlink control channel (PDCCH), etc. The data may be for the physical downlink shared channel (PDSCH), etc. The processor 520 may process (e.g., encode and symbol map) the data and control information to obtain data symbols and control symbols, respectively. The processor 520 may also generate reference symbols, e.g., for the PSS, SSS, and cell-specific reference signal. A transmit (TX) multiple-input multiple-output (MIMO) processor 530 may perform spatial processing (e.g., precoding) on the data symbols, the control symbols, and/or the reference symbols, if applicable, and may provide output symbol streams to the modulators (MODs) 532a through 532t. Each modulator 532 may process a respective output symbol stream (e.g., for OFDM, etc.) to obtain an output sample stream. Each modulator 532 may further process (e.g., convert to analog, amplify, filter, and upconvert) the output sample stream to obtain a downlink signal. Downlink signals from modulators 532a through 532t may be transmitted via the antennas 534a through 534t, respectively.

At the UE 550, the antennas 552a through 552r may receive the downlink signals from the base station 510 and may provide received signals to the demodulators (DE-MODs) 554a through 554r, respectively. Each demodulator 554 may condition (e.g., filter, amplify, downconvert, and digitize) a respective received signal to obtain input samples. Each demodulator 554 may further process the input samples (e.g., for OFDM, etc.) to obtain received symbols. A MIMO detector 556 may obtain received symbols from all the demodulators 554a through 554r, perform MIMO detection on the received symbols if applicable, and provide detected symbols. A receive processor 558 may process (e.g., demodulate, deinterleave, and decode) the detected symbols, provide decoded data for the UE 550 to a data sink 560, and provide decoded control information to a controller/processor 580.

On the uplink, at the UE 550, a transmit processor 564 may receive and process data (e.g., for the PUSCH) from a data source 562 and control information (e.g., for the PUCCH) from the controller/processor 580. The processor 564 may also generate reference symbols for a reference signal. The symbols from the transmit processor 564 may be precoded by a TX MIMO processor 566 if applicable, further processed by the modulators 554a through 554r (e.g., for single carrier-frequency division multiple access (SC-FDMA), etc.), and transmitted to the base station 510. At the base station 510, the uplink signals from the UE 550 may be received by the antennas 534, processed by the demodulators 532, detected by a MIMO detector 536 if applicable, and further processed by a receive processor 538 to obtain decoded data and control information sent by the UE 550. The processor 538 may provide the decoded data to a data sink 539 and the decoded control information to the controller/processor 540. The base station 510 can send messages to other base stations, for example, over an X2 interface 541.

The controllers/processors 540 and 580 may direct the operation at the base station 510 and the UE 550, respectively. The processor 540/580 and/or other processors and modules at the base station 510/UE 550 may perform or direct the execution of the functional blocks illustrated in FIG. 5, and/or other processes for the techniques described herein. For example, the memory 582 of the UE 550 may store a power scan/synchronization channel decoding procedure module 591 which, when executed by the controller/processor 580, configures the UE 550 to determine neighbor cells for power scan, synchronization channel decoding procedures and/or system information collection according to aspects of the present disclosure. The memories 542 and 582 may store data and program codes for the base station 510 and the UE 550, respectively. A scheduler 544 may schedule UEs for data transmission on the downlink and/or uplink.

In the uplink, the controller/processor 580 provides demultiplexing between transport and logical channels, packet reassembly, deciphering, header decompression, control signal processing to recover upper layer packets from the UE 550. Upper layer packets from the controller/processor 580 may be provided to the core network. The controller/processor 580 is also responsible for error detection using an acknowledgement (ACK) and/or negative acknowledgement (NACK) protocol to support hybrid automatic repeat request (HARQ) operations.

Figure 6:
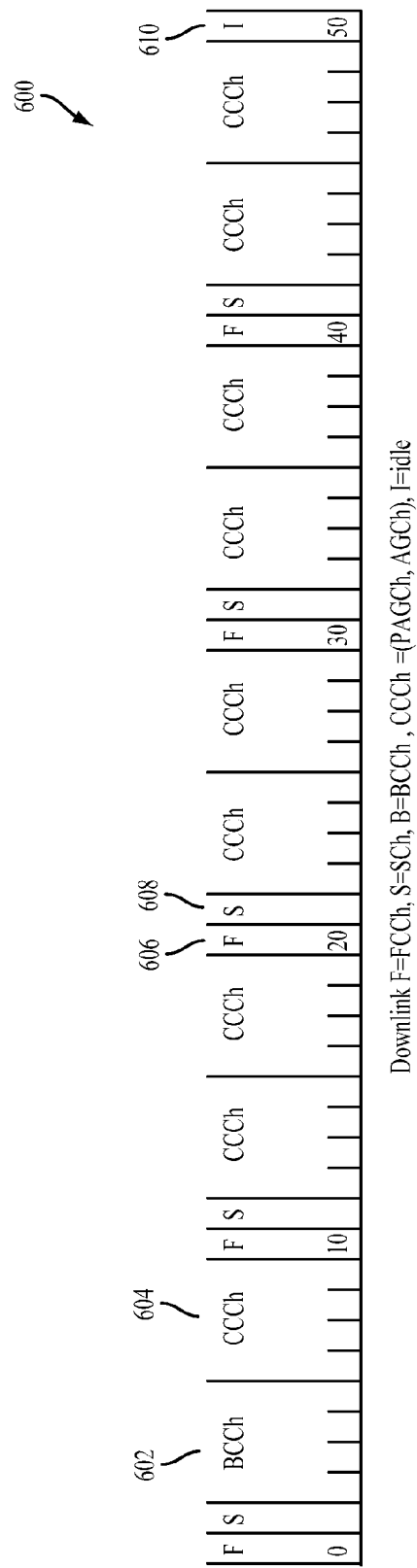
FIG. 6 is a block diagram illustrating the timing of channel carriers according to aspects of the present disclosure.

FIG. 6 is a block diagram 600 illustrating the timing of channels according to aspects of the present disclosure. The block diagram 600 shows a broadcast control channel (BCCH) 602, a common control channel (CCCH) 604, a frequency correction channel (FCCH) 606, a synchronization channel (SCH) 608 and an idle time slot 610. The numbers at the bottom of the block diagram 600 indicate various moments in time. In one configuration, the numbers at the bottom of the block diagram 600 are in seconds. In one configuration, each block of an FCCH 606 may include eight time slots, with only the first timeslot (or TS0) used for FCCH tone detection.

The timing of the channels shown in the block diagram 600 may be determined in a base station identity code (BSIC) identification procedure. The BSIC identification procedure may include detection of the FCCH carrier 606, based on a fixed bit sequence that is carried on the FCCH 606. FCCH tone detection is performed to find the relative timing between multiple radio access technologies (RATs). The FCCH tone detection may be based on the SCH 608 being either a first number of frames or a second number of frames later in time than the FCCH 606. The first number of frames may be equal to 11+n·10 frames and the second number of frames may be equal to 12+n·10 frames. The dot operator represents multiplication and n can be any positive number. These equations are used to schedule idle time slots to decode the SCH. The first number of frames and the second number of frames may be used to schedule idle time slots in order to decode the SCH 608, in case the SCH 608 falls into a measurement gap or an idle time slot 610.

For FCCH tone detection in an inter-RAT measurement, the FCCH may fully or partially fall within the idle time slots of the first RAT (not shown). The UE attempts to detect FCCH tones (for example, such as the FCCH 606) on the BCCH carrier of the n strongest BCCH carriers of the cells in the second RAT. The strongest cells in the second RAT may be indicated by a measurement control message. In one configuration, n is eight and the n BCCH carriers are ranked in order of the signal strength. For example, a BCCH carrier may be ranked higher than other BCCH carriers when the signal strength of the BCCH carrier is stronger than the signal strength of the other BCCH carriers. The top ranked BCCH carrier may be prioritized for FCCH tone detection.

Each BCCH carrier may be associated with a neighbor cell in the second RAT. In some instances, the UE receives a neighbor cell list including n ranked neighbor cells from a base station of the first RAT, for example, in a measurement control message. The neighbor cells in the neighbor cell list may be ranked according to signal strength. In some configurations, the n ranked neighbor cells may correspond to the n strongest BCCH carriers, such that system acquisition of the neighbor cells includes FCCH tone detection of these BCCH carriers.

Figure 7:
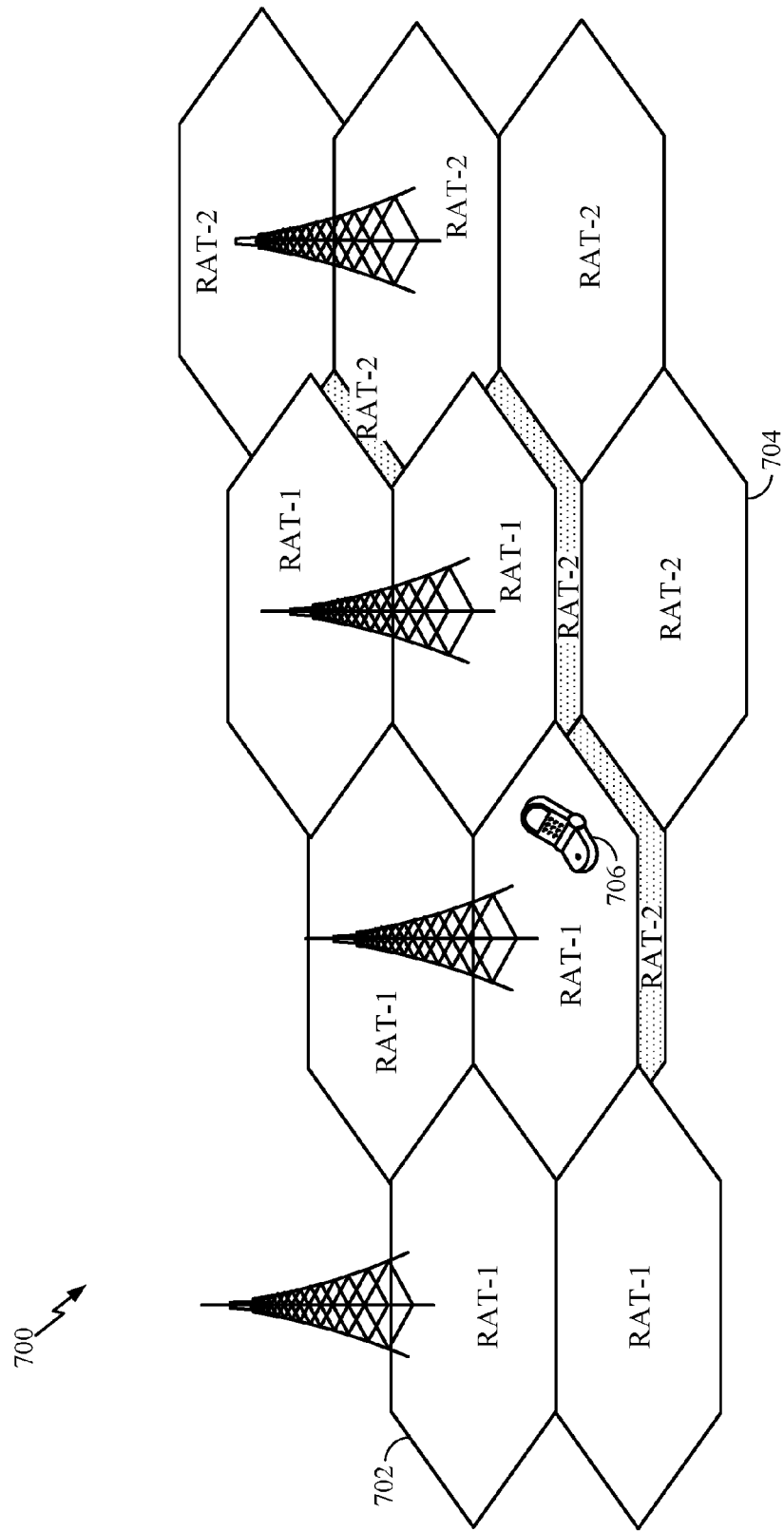
FIG. 7 is a diagram illustrating network coverage areas according to aspects of the present disclosure.

Some networks may be deployed with multiple radio access technologies. FIG. 7 illustrates a network utilizing multiple types of radio access technologies (RATs), such as but not limited to GSM (second generation (2G)), W-CDMA (third generation (3G)), LTE (fourth generation (4G)) and fifth generation (5G). Multiple RATs may be deployed in a network to increase capacity. Typically, 2G and 3G are configured with lower priority than 4G. Additionally, multiple frequencies within LTE (4G) may have equal or different priority configurations. Reselection rules are dependent upon defined RAT priorities. Different RATs are not configured with equal priority.

In one example, the geographical area 700 includes RAT-1 cells 702 and RAT-2 cells 704. In one example, the RAT-1 cells are 2G or 3G cells and the RAT-2 cells are LTE cells. However, those skilled in the art will appreciate that other types of radio access technologies may be utilized within the cells. A user equipment (UE) 706 may move from one cell, such as a RAT-1 cell 702, to another cell, such as a RAT-2 cell 704. The movement of the UE 706 may specify a handover or a cell reselection.

The handover or cell reselection may be performed when the UE moves from a coverage area of a first RAT to the coverage area of a second RAT, or vice versa. A handover or cell reselection may also be performed when there is a coverage hole or lack of coverage in one network or when there is traffic balancing between a first RAT and the second RAT networks. As part of that handover or cell reselection process, while in a connected mode with a first system (e.g., LTE) a UE may be specified to perform a measurement of a neighboring cell (such as GSM cell). For example, the UE may measure the neighbor cells of a second network for signal strength, frequency channel, and base station identity code (BSIC). The UE may then connect to the strongest cell of the second network. Such measurement may be referred to as inter-radio access technology (IRAT) measurement.

The UE may send to a serving cell a measurement report indicating results of the IRAT measurement performed by the UE. The serving cell may then trigger a handover of the UE to a new cell in the other RAT based on the measurement report. The measurement may include a serving cell signal strength, such as a received signal code power (RSCP) for a pilot channel (e.g., primary common control physical channel (PCCPCH)). The signal strength is compared to a serving system threshold. The serving system threshold can be indicated to the UE through dedicated radio resource control (RRC) signaling from the network. The measurement may also include a neighbor cell received signal strength indicator (RSSI). The neighbor cell signal strength can be compared with a neighbor system threshold. Before handover or cell reselection, in addition to the measurement processes, the base station IDs (e.g., BSICs) are confirmed and re-confirmed.

Ongoing communication on the UE may be handed over from the first RAT to a second RAT based on measurements performed on the second RAT. For example, the UE may tune away to the second RAT to perform the measurements. The UE may handover communications according to a single radio voice call continuity (SRVCC) procedure. SRVCC is a solution aimed at providing continuous voice services on packet-switched networks (e.g., LTE networks). In the early phases of LTE deployment, when UEs running voice services move out of an LTE network, the voice services can continue in the legacy circuit-switched (CS) domain using SRVCC, ensuring voice service continuity. SRVCC is a method of inter-radio access technology (IRAT) handover. SRVCC enables smooth session transfers from voice over internet protocol (VoIP) over the IP multimedia subsystem (IMS) on the LTE network to circuit-switched services in the universal terrestrial radio access network (UTRAN) or GSM enhanced date rates for GSM Evolution (EDGE) radio access network (GERAN).

LTE coverage is limited in availability. When a UE that is conducting a packet-switched voice call (e.g., voice over LTE (VoLTE) call) leaves LTE coverage or when LTE network is highly loaded, SRVCC may be used to maintain voice call continuity from a packet-switched (PS) call to a circuit-switched call during IRAT handover scenarios. SRVCC may also be used, for example, when a UE has a circuit-switched voice preference (e.g., circuit-switched fallback (CSFB)) and packet-switched voice preference is secondary if combined attach fails. The evolved packet core (EPC) may send an accept message for PS Attach in which case a VoIP/IMS capable UE initiates a packet-switched voice call.

A UE may perform an LTE serving cell measurement. When the LTE serving cell signal strength or quality is below a threshold (meaning the LTE signal may not be sufficient for an ongoing call), the UE may report an event 2A (change of the best frequency). In response to the measurement report, the LTE network may send radio resource control (RRC) reconfiguration messages indicating 2G/3G neighbor frequencies. The RRC reconfiguration message also indicates event B1 (neighbor cell becomes better than an absolute threshold) and/or B2 (a serving RAT becomes worse than a threshold and the inter-RAT neighbor becomes better than another threshold). The LTE network may also allocate LTE measurement gaps. For example, the measurement gap for LTE is a 6 ms gap that occurs every 40 or 80 ms. The UE uses the measurement gap to perform 2G/3G measurements and LTE inter-frequency measurements.

The measurement gap may be used for multiple IRAT measurements and inter-frequency measurements. The inter-frequency measurements may include measurements of frequencies of a same RAT (e.g., serving LTE). The IRAT measurements may include measurements of frequencies of a different RAT (e.g., non-serving RAT such as GSM). In some implementations, the LTE inter-frequency measurements and 3G IRAT measurements have a higher measurement scheduling priority than GSM.

Handover in conventional systems may be achieved by performing IRAT measurements and/or inter-frequency measurements. For example, the IRAT and/or inter-frequency searches and/or measurements include LTE inter-frequency searches and measurements, 3G searches and measurements, GSM searches and measurements, etc. followed by base station identity code (BSIC) procedures. The measurements may be attempted in measurements gaps that are inadequate (e.g., short duration such as 6 ms gap) for completion of the measurement procedure. In one instance, BSIC procedures may not be accomplished because a base station identification information does not fall within the short duration measurement gap. The BSIC procedures include frequency correction channel (FCCH) tone detection and synchronization channel (SCH) decoding that are performed after signal quality measurements.

When the base station identification information falls outside of the short duration measurement gap, the UE may be unable to detect the base station identification information and may be unable to synchronize with a target cell. For example, using a conventional 6 ms gap for every predefined time period (e.g., 40 ms or 80 ms), the base station identification information (e.g., FCCH and/or SCH) may not occur within the short duration measurement gap. That is, the FCCH and/or SCH do not occur during a remaining 5 ms gap after a frequency tuning period of 1 ms. If the UE is unable to detect the base station identification information communications may be interrupted. Further, repeated failed attempts by the UE may waste the UE's power.

The unpredictable failure of the FCCH/SCH to occur within the short duration measurement gap causes a variation of the IRAT measurement latency (e.g., increasing IRAT measurement latency). The failure of the FCCH/SCH to occur within the measurement gap may be due to a relative time between a serving RAT (e.g., LTE) and a neighbor RAT (e.g., GSM). The relative time impacts a time duration for the FCCH/SCH to fall into the 5 ms useful measurement gap (1 ms for frequency tuning). For example, the allocated time resources (e.g., frame timing) for the serving RAT and the neighbor RAT may be misaligned or offset, which causes failure of the FCCH/SCH to occur within the measurement gap of the serving RAT.

Because the UE may not be aware of the cause of the failure to detect the FCCH tone, for example, the UE may continue to attempt to detect the FCCH tone until an abort timer expires, which may cause delays in or interruptions to UE communications. For example, the UE may not be aware that the failure to detect the FCCH tone of the strongest frequency with the highest RSSI is due to low signal to noise ratio or FCCH occurring outside the measurement gap. As a result, the UE waits for an abort timer (e.g., 5 ms) to expire and then moves to the next strongest frequency. Waiting for expiration of the abort timer unnecessarily increase the IRAT measurement latency. However, if the UE aborts the FCCH tone detection prematurely, the UE may miss a chance of the FCCH occurring during the measurement gap.

After the measurements, the UE may send a measurement report to the serving RAT. For example, the UE only sends the measurement report (e.g., B1 measurement report) after the completion of the BSIC procedures. Thus, the reporting of the results of the signal quality measurement, which occurs over a shorter period and which may occur on multiple occasions before the completion of the BSIC procedures, are delayed. Further, a transmission time interval (TTI) may expire prior to the completion of the BSIC procedures that result in an increase in latency or communication interruption. Measurement reports are transmitted to a network after the expiration of the TTI. Because the BSIC procedures are not complete, the measurement reports cannot be sent even when the TTI expires. An exemplary search and measurement procedure is illustrated in FIG. 8.

Figure 8:
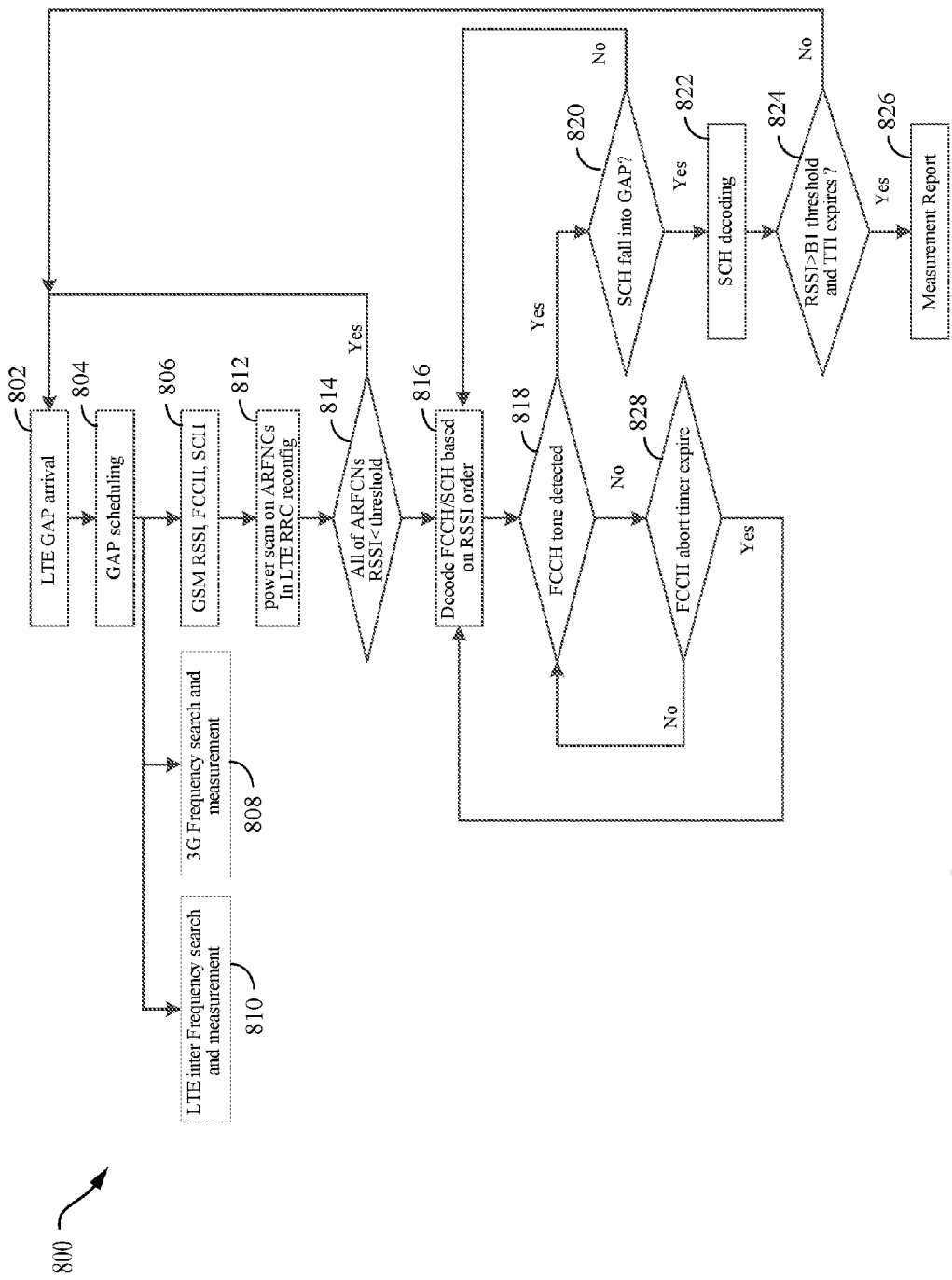
FIG. 8 is a flow diagram illustrating an example decision process for search and measurement of neighbor cells.

FIG. 8 is a flow diagram 800 illustrating an example decision process for search and measurement of neighbor cells. The measurement may occur when the UE is on a first RAT (e.g., LTE) with a short duration measurement gap (e.g., 6 ms) every predefined period (e.g., 40 ms or 80 ms). The searches and measurements may include inter-frequency searches and measurements and inter-radio access technology (IRAT) searches and measurements. At block 802, measurement gap information transmitted by a network of the first RAT is received by the UE. For example, the measurement gap for LTE is a 6 ms gap that occurs every 40 or 80 ms. The UE uses the measurement gap to perform 2G/3G (e.g., TD-SCDMA and GSM) searches and measurements and LTE inter-frequency searches and measurements. A search and/or measurement schedule for the neighbor cells may be received by the UE from the network, as shown in block 804. The searches and measurements of the neighbor cells may be scheduled based on priority. For example, searches and measurements of LTE/TD-SCDMA neighbor cells or frequencies may have a higher priority than GSM neighbor cells. At blocks 806, 808 and 810, the UE performs inter-radio access technology (IRAT) and/or inter-frequency searches and/or measurements. The IRAT and/or inter-frequency searches and/or measurements include LTE inter-frequency searches and measurements, 3G searches and measurements, GSM searches, measurements and BSIC procedures, respectively, according to the schedule.

The user equipment performs measurements by scanning frequencies (e.g., power scan), as shown in block 812. The UE then determines whether a signal quality of a serving cell of a first RAT and the signal quality of neighbor cells meet a threshold, as shown in block 814. For example, it is determined whether the signal qualities (e.g., received signal strength indicators (RSSIs)) of the neighbor cells are less than the threshold. The threshold can be indicated to the UE through dedicated radio resource control (RRC) (e.g., LTE RRC reconfiguration) signaling from the network. When the signal quality of the neighbor cells fails to meet a threshold the process returns to block 802, in which the UE receives a next measurement gap information. However, when the signal qualities of one or more target neighbor cells meet the threshold, the UE continues to perform the BSIC procedures, as shown in block 816. The BSIC procedures may be performed on the target neighbor cells in order of signal quality. For example, the BSIC procedures may be performed on the cell with the best signal quality, followed by the cell with the second best signal quality and so on. The BSIC procedures include frequency correction channel (FCCH) tone detection and synchronization channel (SCH) decoding) that are performed after signal quality measurements.

In block 818, the UE may determine whether an FCCH tone is detected for a cell of the target cells (e.g., cell with best signal quality). If the FCCH tone is detected for the best cell, the UE determines whether the SCH falls into the measurement gap, as shown in block 820. In block 820, if the SCH does not fall into the measurement gap, the process returns to block 816, where the UE decodes FCCH/SCH for the target cell with the second best signal quality. However, if the SCH of the target neighbor cell with the best signal quality falls into the measurement gap, the UE performs SCH decoding, as shown in block 822. The UE then determines whether the signal quality of the target neighbor cell is greater than the threshold (e.g., B1 threshold) and whether the TTI has expired, as shown in block 824. If the TTI expired and the signal quality of the target neighbor cell is not greater than the threshold, the process returns to block 802, where the UE receives the measurement gap information. However, if the TTI expired and the signal quality of the target neighbor cell is greater than the threshold, the process continues to block 826, where the UE sends a measurement report to the network. As noted, measurement reports are transmitted to a network only after the expiration of the TTI, even when the other conditions, such as an RSSI being greater than the threshold are met.

When it is determined that the FCCH tone for the target neighbor cell is not detected at block 818, the process continues to block 828, where it is determined whether the FCCH abort timer expired. If the FCCH abort time is not expired, the process returns to block 818, where the UE continues to determine whether an FCCH tone is detected for the target neighbor cell. Otherwise, when it is determined that the FCCH abort timer expired at block 828, the process returns to block 816 where FCCH/SCH is decoded for the next target neighbor cell.

The BSIC procedures, which include frequency correction channel (FCCH) tone detection and synchronization channel (SCH) decoding) that are performed after signal quality measurements, may further cause a drain in the UE battery power. For example, the UE may repeatedly attempt to detect an FCCH tone or to decode SCH when the SCH/FCCH does not fall in an allocated measurement gap. The repeated attempts further drain the UE battery power.

Power savings is especially important to ensure improved battery life for packet-switched devices (e.g., VoLTE devices) where voice calls (voice over internet protocol calls) can be frequent and long. During the voice over internet protocol calls, voice packet arrivals may exhibit traffic characteristics that are discontinuous. A discontinuous reception (DRX) mechanism may be implemented to reduce power consumption based on the discontinuous traffic characteristics of the voice packet arrivals.

In some implementations, the UE is awake during the time period (e.g., C-DRX off duration) allocated for the sleep mode. During the C-DRX off duration or during an allocated measurement gap, the UE performs activities or measurement procedures. For example, the UE performs neighbor RAT (e.g., global system for mobile (GSM)) signal quality measurements (inter-radio access technology (IRAT) measurements and/or inter-frequency measurements) for a list of frequencies (e.g., GSM absolute radio frequency channel numbers (ARFCNs)). The measurement procedures also include synchronization channel decoding procedures that may be performed after the signal quality measurements of the neighbor cells. The synchronization channel decoding procedures include frequency correction channel (FCCH)/synchronization channel (SCH) decoding for multiple frequencies of the neighbor RAT based on an order of signal quality until an end of the C-DRX off duration. Different RATs may include different channels for synchronization or timing. For example, the channels for synchronization in wideband code division multiple access (WCDMA) include primary synchronization channel (PSCH) and secondary synchronization channel (SSCH).

Measurement gaps may be allocated by a network for measurement procedures. The measurement procedures may include IRAT measurements and/or inter-frequency measurements. The inter-frequency measurements may include measurement of frequencies of a same RAT (e.g., LTE). For example, the UE connected to a serving LTE RAT measures LTE neighbor frequencies. The IRAT measurements may include measurements of frequencies of a different RAT (e.g., GSM). For example, the UE connected to a serving LTE RAT measures frequencies of neighbor GSM RAT.

Measurement gaps allocated for inter-frequency measurement of a serving RAT may be independent of measurement gaps allocated for IRAT measurement. The inter-frequency measurements include signal quality measurements. The IRAT measurements include signal quality measurements followed by synchronization channel decoding procedures or BSIC procedures. The synchronization channel decoding procedures include FCCH tone detection and SCH decoding.

For example, after signal quality measurements (e.g., RSSI measurements) are performed for all GSM frequencies (e.g., absolute radio frequency channel numbers (ARFCNs)), a UE performs FCCH tone detection only for a strongest GSM frequency during every measurement gap until an abort timer expires. The UE also continues to periodically perform inter-frequency measurements during the synchronization channel decoding procedures. During the FCCH tone detection, the UE detects the FCCH during the measurement gap. In some instances, however, the FCCH falls into or is received when an inter-frequency measurement is scheduled to occur in a same measurement gap. When this happens, the UE conventionally performs the inter-frequency measurement using the measurement gap because inter-frequency measurement has a higher priority than IRAT measurement and the corresponding FCCH tone detection. Performing the inter-frequency measurement instead of the FCCH tone detection increases delay associated with IRAT measurement and therefore increases call drops in a serving RAT (e.g., LTE) before handover to a target RAT (e.g., GSM).

Redirection from one RAT to another RAT is commonly used to perform operations such as load balancing or circuit switched fallback from one RAT to another RAT. For example, one of the RATs may be long term evolution (LTE) while the other RAT may be universal mobile telecommunications system—frequency division duplexing (UMTS frequency-division duplexing (FDD)), universal mobile telecommunications system—time division duplexing (UMTS TDD), or global system for mobile communications (GSM). In some aspects, the redirection may be from a frequency or cell of one RAT to a frequency or cell of the same RAT.

Circuit switched fallback is a feature that enables multimode user equipments (UEs) that are capable of communicating on a first RAT (e.g., LTE) in addition to communicating on a second RAT (e.g., second/third generation (2G/3G) RAT) to obtain circuit switched voice services while being camped on the first RAT. For example, the circuit switched fallback capable UE may initiate a mobile-originated (MO) circuit switched voice call while on LTE. Because of the mobile-originated circuit switched voice call, the UE is redirected to a circuit switched capable RAT. For example, the UE is redirected to a radio access network (RAN), such as a 3G/2G network, for the circuit switched voice call setup. In some instances, the circuit switched fallback capable UE may be paged for a mobile-terminated (MT) voice call while on LTE, which results in the UE being moved to 3G or 2G for the circuit switched voice call setup.

Figure 11:
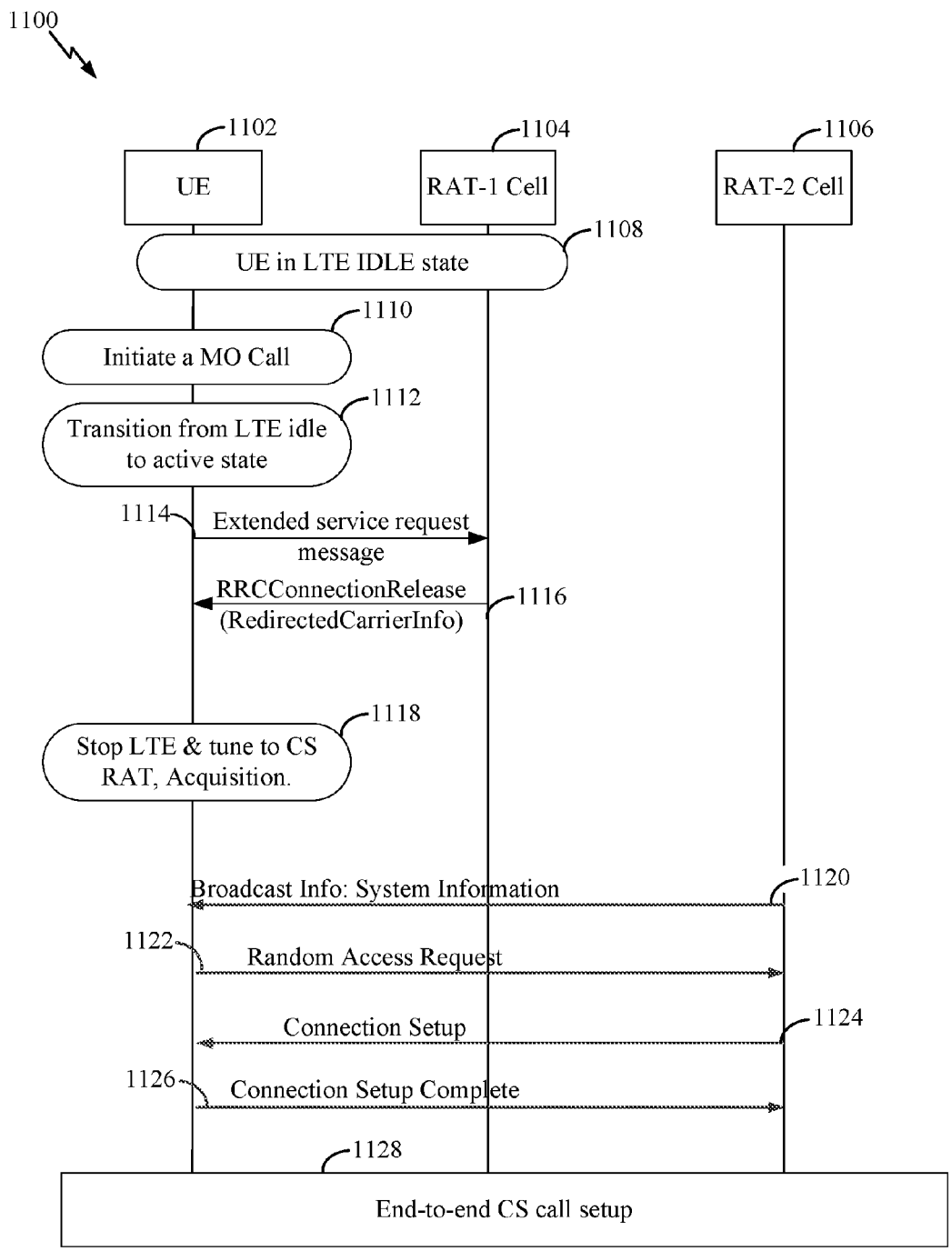
FIG. 11 is a call flow diagram conceptually illustrating an example process for a cell selection for circuit switched fallback (CSFB) calls according to aspects of the present disclosure.

Circuit switched fallback setup may be subject to call setup latency. Some techniques for reducing latency for circuit switched fallback call setup include system information block (SIB) tunneling and deferred measurement control reading (DMCR). Circuit switched fallback call setup latency is metric used for gauging circuit switched fallback performance. The longer it takes to establish a circuit switched fallback call, the more negatively user perception is impacted. For circuit switched fallback to UTRAN, the call setup delay increases due to additional signaling on both LTE and the circuit switched RAT. A substantial part of the call setup delay is due to reading system information on the circuit switched RAT prior to access, after completing system information collection, after which the UE starts access procedures to set up the circuit switched call in circuit switched RAT, as illustrated in FIG. 11.

Conventionally, when a user equipment (UE) receives a first RAT release message (e.g., long term evolution (LTE) radio resource control (RRC) release message) with a redirection command including a list neighbor frequencies (e.g., GSM frequencies or GSM absolute radio frequency channel numbers (ARFCNs)), the UE performs power scan for all of the GSM frequencies. The UE performs the power scan to determine the signal quality of each of the neighbor frequencies. For example, the power scan involves performing measurements (e.g., IRAT and/or inter-frequency measurements) during measurement gaps (e.g., 6 ms gap) allocated by a network. The IRAT and/or inter-frequency measurements may include LTE inter-frequency measurements, 3G measurements, GSM measurements, etc. The UE then determines whether the signal quality of each of the neighbor cells is above a signal quality threshold. The UE then sorts the neighbor frequencies with signal qualities that are above the signal quality threshold based on their signal quality or strength. Thus, the neighbor frequencies are ordered from the strongest neighbor frequency to the weakest neighbor frequency with respect to signal quality.

The IRAT and/or inter-frequency measurements are followed by base station identity code (BSIC) procedures or synchronization channel decoding procedures. Then, the UE performs FCCH/SCH decoding based on signal strength (e.g., RSSI) order. The synchronization channel decoding procedures include downlink timing detection and synchronization decoding. For example, the synchronization channel decoding procedures include frequency correction channel (FCCH) tone detection and synchronization channel (SCH) decoding that are performed after signal quality measurements. FCCH tone detection enables determination of downlink timing while SCH decoding is for cell identification. In some implementations, the UE performs FCCH tone detection and/or SCH decoding based an RS SI order.

The UE performs the FCCH tone detection and the SCH decoding of the neighbor frequencies based on the order of signal quality of the neighbor frequencies starting from the strongest frequency. After the UE performs frequency correction channel (FCCH) tone detection and/or synchronization channel (SCH) decoding for the strongest neighbor frequency, the UE calculates an arrival time of system information from a broadcast channel associated with the strongest frequency. For example, the UE calculates an arrival time of system information block 3 (SIB3) on a broadcast control channel (BCCH) of the strongest frequency. The UE calculates the arrival time of the SIB3 for the strongest frequency based on a frame number of the first RAT (e.g., GSM frame number) carried in the synchronization channel, SIB3 indicated in a public land mobile network (PLMN) identification, a minimal RSSI level for camping, a barred status, etc.

When there is enough time between the FCCH tone detection and/or SCH decoding for the strongest neighbor frequency or cell and the arrival time of the SIB3 for the strongest frequency, the UE performs FCCH tone detection and/or SCH decoding for the next strongest frequencies according to the order of signal qualities. For example, the UE performs FCCH tone detection and/or SCH decoding for second, third and fourth strongest neighbor frequencies, and then calculates the arrival time of the SIB3 for the second, third and fourth strongest neighbor frequencies. Sometimes, one or more of the SIB 3 of the second, third and fourth strongest neighbor frequencies arrives earlier than the SIB 3 of the strongest frequency. Thus, after the UE decodes the SIB 3 of the second, third and fourth strongest neighbor frequencies, the UE continues to wait for the SIB 3 of the strongest neighbor frequency. For example, the UE waits for an arrival of a BCCH corresponding to the strongest neighbor frequency.

After the UE receives the BCCH for the strongest frequency, UE moves into an early camp procedure. The UE decodes the BCCH for only the strongest frequency to obtain system information and other communication information. For example, after collecting all SIBs, the UE may select the GSM cell corresponding to the strongest frequency for circuit switched fallback. A network of the second RAT may broadcast a location area represented by a location area identity. The location area identity may be broadcast regularly through the BCCH. A change of location area may give rise to a location area update request. After collecting all of the system information (SIBs) for the strongest cell, the UE selects the strongest cell for a circuit switched fallback call. Waiting for the SIB 3 of the strongest neighbor frequency delays establishment of the circuit switch fallback call.

Further, the UE records system information previously collected for neighbor frequencies to accelerate system information collection. For example, when the cell identification associated with the strongest frequency matches a cell identification associated with a recorded frequency the UE may skip some of the system information collection and speed up circuit switched fallback call setup. In place of the skipped collection of system information, the UE may use previously recorded system information. However, when the location area code from the system information of the strongest cell does not match the location area code of a previously registered location area code of the strongest cell, the UE performs location area update procedures before proceeding with circuit switched fallback cell establishment. Performing the location area update procedures for the strongest cell before the circuit switched fallback establishment increases latency for the circuit switched fallback call establishment. The location area update procedure may delay the establishment of the circuit switched fallback call for as long as two to five seconds or more depending on the network load. Accordingly, it is desirable to speed up the establishment of the circuit switched fallback call.

Base Station Identity Code and System Information Collection

Aspects of the present disclosure are directed to speeding up circuit switched fallback call establishment and to reducing circuit switched fallback call establishment failure. In one aspect of the disclosure, a user equipment (UE) receives a redirection command from a current serving cell of a serving RAT (radio access technology). The redirection command includes a list of current neighbor frequencies (or cells) of a neighbor RAT to be selected for the redirection. The current neighbor frequencies correspond to the frequencies of current neighbor cells of the serving cell.

The UE determines whether a cell identification of the current serving cell matches a stored serving cell identification of a previous serving cell. In addition to storing the previous serving cell and its corresponding cell identification, the UE stores previous neighbor cells/frequencies of the previous serving cell and their corresponding cell identifications. Further, the UE stores previously recorded type of redirection results (e.g., redirection results history) for each of the previous neighbor cells. The redirection results history may be stored in a memory of the UE, as shown in Table 1. For example, when the UE was camped on previous serving cell A, as illustrated in Table 1, the previous neighbor cells of the previous serving cell included neighbor cells A, B and C.

Table 1 further indicates that a previous attempt, by the UE, to be redirected to the previous neighbor cell A was unsuccessful while a previous attempt to be redirected to neighbor cells B and C was successful. However, the successful redirection to previous neighbor cell B included an additional location update while the successful redirection to previous neighbor cell C did not include the additional location update.

Furthermore, Table 1 indicates that when the UE was camped on serving cell B, the previous neighbor cells included neighbor cells B and C. A previous attempt, by the UE, to be redirected to previous neighbor cell B was unsuccessful while a previous attempt to be redirected to neighbor cell C was successful. In this case, the UE was redirected to the previous neighbor cell C without the performance of the location area update. When the UE was camped on serving cell C, however, the previous neighbor cells included neighbor cells A and B. A previous attempt, by the UE, to be redirected to the previous neighbor cells A and B were successful. However, the redirection to the previous neighbor cell B included the performance of the location area update.

TABLE 1

| Serving Cell | Neighbor Cell A Redirection Result | Neighbor Cell B Redirection Result | Neighbor Cell C Redirection Result |
|---|---|---|---|
| Serving Cell A | unsuccessful | Successful redirection with location area update | Successful redirection without location area update |
| Serving Cell B | N/A | unsuccessful | Successful redirection without location area update |
| Serving Cell C | Successful redirection without location area update | Successful redirection with location area update | N/A |

In one aspect of the disclosure, the UE evaluates the list of the current neighbor cells associated with the current serving cell, where the current serving cell is matched with a previous serving cell that is stored in the memory of the UE. For example, the UE evaluates the list of the current neighbor cells to determine whether each current neighbor cell matches one of the previous neighbor cells of the matched previous serving cell. The determination may be based on comparing the cell identification of the current and the stored cell identification of the previous neighbor cells. For example, when the UE is camped on the serving cell A, the UE stores the cell identification of serving cell A and the cell identification of the neighbor cells A, B and C. Thus, when the UE is camped on the current serving cell, the UE compares the cell identification of the current serving cell to the cell identification of the previously recorded serving cells to determine whether any cell identifications match. The UE also compares the cell identifications in the list of current neighbor cells to the cell identifications of the stored neighbor cells to determine whether any cell identifications match.

The UE then determines the current neighbor cells/frequencies for power scanning, synchronization channel decoding procedures and/or system information collection in order to select a neighbor cell to redirect the UE based on the previously recorded type of redirection result. For example, the power scanning procedures may include scanning the neighbor frequencies to perform measurements of the neighbor frequencies in order to determine the signal qualities of the neighbor frequencies. The synchronization channel decoding procedures include FCCH tone detection and SCH decoding. After performing a GSM power scan of current neighbor cells/frequencies, the UE performs a collection of system information for GSM ARFCNs of GSM cells whose SIBs are recorded in the UE buffer. The system information collection involves collection of system information blocks such as system information block 3 (SIB 3).

In some aspects of the disclosure, the UE selects a neighbor cell for redirection that is matched to a previous neighbor cell with a successful redirection and avoids neighbor cells with an unsuccessful redirection in order to avoid circuit switch fallback call establishment failure or delays. Furthermore, the UE may select the neighbor cell for redirection that is matched with a previous neighbor cell with successful redirection, without location area update, rather than a neighbor cell with location area update to avoid the delays associated with performing the location area updates.

In some aspects of the disclosure, the UE performs future power scans, synchronization channel decoding procedures and/or system information collection for each current neighbor cell having a signal quality above a first threshold. The determination of whether the signal quality of the current neighbor cell is above the first threshold is based on the power scan. For example, the UE scans the frequencies of the current neighbor cells, performs signal quality measurements of the current neighbor cells and determines the current neighbor cells that have signal qualities that are above the first threshold. Accordingly, in addition to determining the current neighbor cells for the power scan, the synchronization channel decoding procedures and the system information collection based on the previously recorded type of redirection result, the determination also includes a determination of whether each current neighbor cell of the current neighbor cells has a signal quality that is above the first threshold. For example, the UE selects the current neighbor cells that have their signal qualities above the first threshold for performing the synchronization channel decoding procedures. For example, if a signal to noise ratio of a signal of a GSM cell is above 10 dB, the RSSI is above −95 dBm, and a location area code (LAC) matches a registered location area (LA), the UE may select the GSM cell for circuit switched fallback. Otherwise the UE performs the BSIC and SIB 3 collection procedure for the rest of the GSM ARFCNs based on RSSI order in the LTE RRC connection release message.

In addition, when all of the current neighbor cells that match the previously recorded neighbor cells have signal qualities below the first threshold or when no matching neighbor frequencies are found, the UE selects unmatched cells or cells that do not belong to the list of current neighbor cells. The selection may be based on whether the signal qualities of the unmatched neighbor cells or the unlisted cells are greater than or equal to the first threshold. For example, the unmatched or unlisted frequencies are selected for future power scanning, synchronization channel decoding procedures or system information collection when their signal qualities are greater than or equal to the first threshold.

In some implementations, in addition to determining that each of the signal qualities of the matched current neighbor cells are below the first threshold, the UE may also determine how far each of the signal qualities are below the first threshold. In this case, the UE compares the signal qualities of the matched current neighbor frequencies to a tolerance threshold value that is lower than the first threshold. For example, the UE determines whether one or more of the signal qualities of the matched neighbor cells are above the tolerance threshold value. For example, the tolerance threshold value may be equal to −95 dBm when the UE is moving at high speed (e.g., 300 km/h). In this case, the UE selects the matched neighbor cells that have signal qualities greater than or equal to −95 dBm. Thus, the UE can use the matched current neighbor cells in the list of current neighbor cells that have a signal quality below the first threshold before using neighbor cells that are unmatched or unlisted, based on how far below the threshold they are.

The UE may also be redirected to a selected current neighbor cell when a signal quality of the selected current neighbor cell is above a second threshold, after performing the synchronization channel decoding procedures. Accordingly, in addition to determining frequencies/cells for future power scan, synchronization channel decoding procedures and/or system information collection based on the previously recorded type of redirection result and/or the signal quality of the current neighbor frequencies, the determination also includes a determination of whether a signal quality of the selected neighbor frequency is above the second threshold. This determination is made after performing the synchronization channel decoding procedures.

In another aspect of the disclosure, the UE determines whether a location of the UE matches a location of one or more current neighbor cells, which are matched to one or more previous neighbor cells stored in the UE. For example, the UE compares its current location to a location of the matched neighbor cells (previous and/or current). The location of the previous neighbor cell may be previously determined and stored in the UE. The location of the UE or the neighbor cells may be indicated by location information such as a location area code. The location information may be identified by the UE and/or indicated to the UE through the serving cell or the neighbor cell. For example, the location of the UE may be determined based on timing advance and beamforming from the serving cell. In some aspects, the UE only identifies the previously recorded type of redirection result for the previous neighbor cells that match the current neighbor cells when the location of the UE matches a location associated with one or more of the previous neighbor cells.

In a further aspect of the disclosure, the UE evaluates the list of the current neighbor cells to determine whether the location of the current neighbor cells and/or UE has changed during the course of communication. For example, the UE compares a location area code of the current neighbor cells and/or the UE before and after performing the power scan and/or the synchronization channel decoding procedures. When the comparison indicates that a location of the UE and/or the location of a selected current neighbor cell changed, the UE performs location area updates prior to redirecting to the selected current neighbor cell.

In yet another aspect of the present disclosure, the UE determines whether to scan a second set of neighbor cells or frequencies following scanning of a first set of neighbor cells or frequencies after performing synchronization channel decoding procedures of the first set of neighbor cells or frequencies. The first set of frequencies corresponds to a first type of redirection result (e.g., successful redirection without location area update) and the second set of frequencies corresponds to a second type of redirection result (e.g., successful redirection with location area update). The UE scans the first set of frequencies corresponding to the first type of redirection results according to a signal quality rank based on results of a previous power scan. The UE then scans the second set of frequencies corresponding to the second type of redirection result when a signal quality of each frequency of the first set of frequencies is below a predetermined signal quality.

Figure 9:
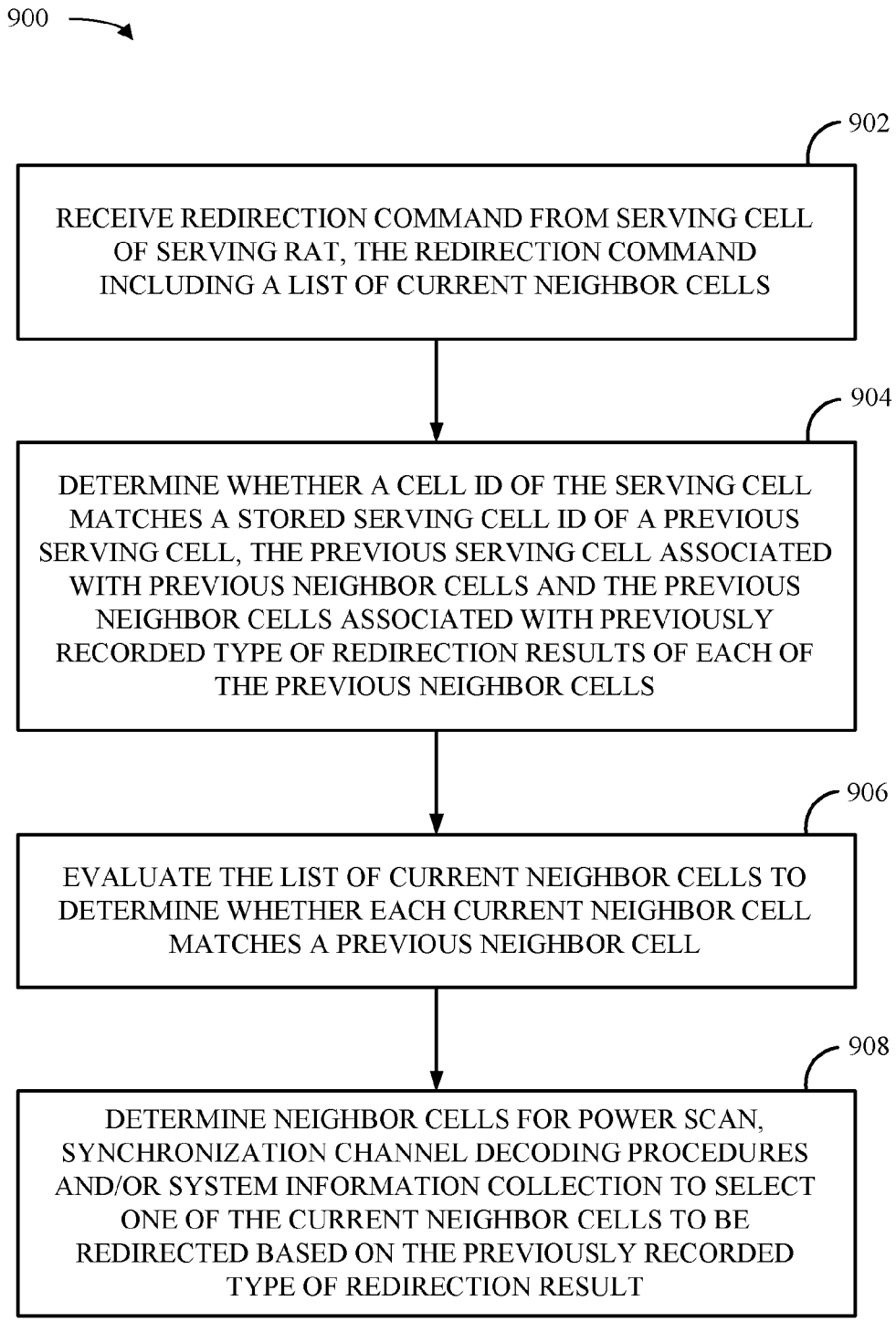
FIG. 9 is a flow diagram illustrating a method for allocating measurement gaps according to one aspect of the present disclosure.

FIG. 9 is a flow diagram illustrating a method 900 for determining neighbor cells for power scan, synchronization channel decoding procedures and/or system information collection according to one aspect of the present disclosure. At block 902, a user equipment (UE) receives a redirection command from a serving cell of a serving RAT (radio access technology). The redirection command includes a list of current neighbor frequencies corresponding to current neighbor cells of a neighbor RAT. At block 904, the UE determines whether a cell identification for the current serving cell matches a stored serving cell identification of a previous serving cell. The previous serving cell is associated with previous neighbor cells and the previous neighbor cells are associated with previously recorded types of redirection results. At block 906, the UE evaluates the list of current neighbor cells to determine whether each current neighbor cell matches a previously recorded neighbor cell. At block 908, the UE determines current neighbor cells for power scan, synchronization channel decoding procedures and/or system information collection to select one of the current neighbor cells to redirect the UE based on the previously recorded type of redirection result.

Figure 10:
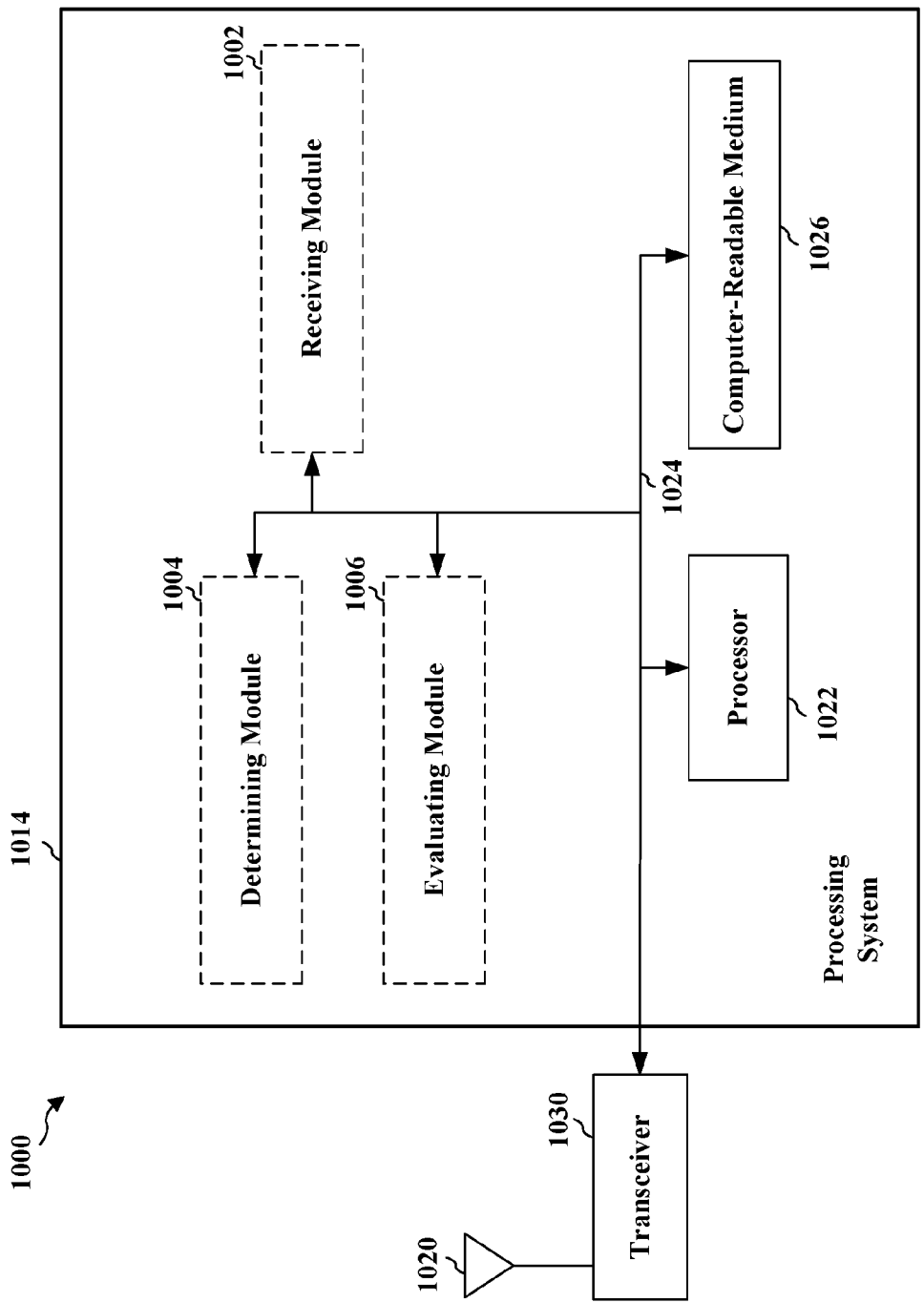
FIG. 10 is a diagram illustrating an example of a hardware implementation for an apparatus employing a processing system according to one aspect of the present disclosure.

FIG. 10 is a diagram illustrating an example of a hardware implementation for an apparatus 1000 employing a processing system 1014 according to one aspect of the present disclosure. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1022, a receiving module 1002, a determining module 1004, an evaluating module 1006 and the non-transitory computer-readable medium 1026. The bus 1024 may also link various other circuits such as timing sources, peripherals, voltage regulators, and power management circuits, which are well known in the art, and therefore, will not be described any further.

The apparatus includes a processing system 1014 coupled to a transceiver 1030. The transceiver 1030 is coupled to one or more antennas 1020. The transceiver 1030 enables communicating with various other apparatus over a transmission medium. The processing system 1014 includes a processor 1022 coupled to a non-transitory computer-readable medium 1026. The processor 1022 is responsible for general processing, including the execution of software stored on the computer-readable medium 1026. The software, when executed by the processor 1022, causes the processing system 1014 to perform the various functions described for any particular apparatus. The computer-readable medium 1026 may also be used for storing data that is manipulated by the processor 1022 when executing software.

The processing system 1014 includes a receiving module for 1002 for receiving a redirection command from a serving cell of a serving RAT (radio access technology). The processing system 1014 also includes a determining module 1004 for determining whether a cell identification for the serving cell matches a stored serving cell identification of a previous serving cell. The determining module 1004 also determines neighbor cells for power scan and/or synchronization channel decoding procedures to select one of the current neighbor cells to be redirected based on the previously recorded type of redirection result. The processing system also includes an evaluating module 1006 for evaluating the list of current neighbor cells to determine whether each current neighbor cell matches a previous neighbor cell. The receiving module 1002, the determining module 1004 and/or the evaluating module 1006 may be software module(s) running in the processor 1022, resident/stored in the computer-readable medium 1026, one or more hardware modules coupled to the processor 1022, or some combination thereof. The processing system 1014 may be a component of the UE 550 of FIG. 5 and may include the memory 582, and/or the controller/processor 580.

In one configuration, an apparatus, such as a UE 550, is configured for wireless communication including means for receiving. In one aspect, the receiving means may be the antenna 552/1020, the transceiver 1030, the receive processor 558, the controller/processor 580, the memory 582, the power scan/synchronization channel decoding procedure module 591, the receiving module 1002, and/or the processing system 1014 configured to perform the aforementioned means. In one configuration, the means functions correspond to the aforementioned structures. In another aspect, the aforementioned means may be a module or any apparatus configured to perform the functions recited by the aforementioned means.

In one configuration, an apparatus, such as a UE 550, is configured for wireless communication including means for determining. In one aspect, the determining means may be the receive processor 558, the controller/processor 580, the memory 582, the power scan/synchronization channel decoding procedure module 591, the determining module 1004, and/or the processing system 1014 configured to perform the aforementioned means. In one configuration, the means functions correspond to the aforementioned structures. In another aspect, the aforementioned means may be a module or any apparatus configured to perform the functions recited by the aforementioned means.

In one configuration, an apparatus, such as a UE 550, is configured for wireless communication including means for evaluating. In one aspect, the evaluating means may be the receive processor 558, the controller/processor 580, the memory 582, the power scan/synchronization channel decoding procedure module 591, the evaluating module 1006, and/or the processing system 1014 configured to perform the aforementioned means. In one configuration, the means functions correspond to the aforementioned structures. In another aspect, the aforementioned means may be a module or any apparatus configured to perform the functions recited by the aforementioned means.

FIG. 11 is a call flow diagram conceptually illustrating an example process for a cell selection for circuit switched fallback (CSFB) calls according to aspects of the present disclosure. The call flow diagram 1100 illustrates the interactions among a UE 1102, a RAT-1 base station 1104 and a RAT-2 base station 1106. In one aspect, the RAT-1 base station 1104 may be an LTE or TD-LTE base station such as the eNodeB 106 of FIG. 1 or base station 510 of FIG. 5. The RAT-2 base station 1106 may be a 2G/3G RAT base station such as a GSM base station or a TD-SCDMA NodeB.

The UE 1102 at time 1108 may be camping on the RAT-1 base station 1104. At time 1110, the UE 1102 may start a mobile originated (MO) voice call and as a result, the UE 1102 may transition from the idle state to an active state, at time 1112. At time 1114, the UE 1102 may send an extended service request to the current serving base station 1104 to request a redirection to a RAT-2 cell 1106 to service the mobile originated call that the UE 1102 just initiated, because the RAT-1 base station 1104 does not support voice calls. A CSFB indicator is included in the extended service request message. The redirection command is to redirect the UE 1102 from one RAT to another RAT for a particular service and it is commonly used for services such as load balancing, circuit switched fallback (CSFB) from LTE to other RAT, among others.

In this example, at time 1116, the UE 1102 may receive a connection release message, such as radio resource control (RRC) connection release message, from the LTE base station 1104. Included in the release message is a set of frequencies of RAT-2 for the UE 1102 to select as a target cell.

At time 1118, the UE 1102 may stop the first RAT, including stopping receiving information from the RAT-1 base station 1104 and tune to the selected target cell of the second RAT. At time 1120, the RAT-2 cell 1106 broadcasts its system information messages on a 2G/3G RAT broadcast channel.

At time 1122, after receiving the system information, the UE 1102 may begin a random access process by sending a random access request to the RAT-2 cell 1106. In response, at time 1124, the RAT-2 cell 1106 may send a connection setup message to allow the UE 1102 to proceed with the connection setup for the circuit switched voice call. At time 1126, the UE 1102 sends a connection setup complete message to indicate that the connection has been established with the RAT-2 cell 1106 for the voice call, completing the CSFB procedure. Once the UE 1102 switches to the RAT-2 cell 1106, the UE 1102 proceeds to setting up an end-to-end circuit switched (CS) call at time 1128.

Several aspects of a telecommunications system has been presented with reference to LTE and GSM systems. As those skilled in the art will readily appreciate, various aspects described throughout this disclosure may be extended to other telecommunication systems, network architectures and communication standards, including those with high throughput and low latency such as 4G systems, 5G systems and beyond. By way of example, various aspects may be extended to other UMTS systems such as W-CDMA, high speed downlink packet access (HSDPA), high speed uplink packet access (HSUPA), high speed packet access plus (HSPA+) and TD-CDMA. Various aspects may also be extended to systems employing long term evolution (LTE) (in FDD, TDD, or both modes), LTE-Advanced (LTE-A) (in FDD, TDD, or both modes), CDMA2000, evolution-data optimized (EV-DO), ultra mobile broadband (UMB), IEEE 802.11 (Wi-Fi), IEEE 802.16 (WiMAX), IEEE 802.20, ultra-wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a non-transitory computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the term "signal quality" is non-limiting. Signal quality is intended to cover any type of signal metric such as received signal code power (RSCP), reference signal received power (RSRP), reference signal received quality (RSRQ), received signal strength indicator (RSSI), signal to noise ratio (SNR), signal to interference plus noise ratio (SINR), etc.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication, comprising:
   receiving a redirection command from a serving cell of a serving RAT (radio access technology), the redirection command including a list of current neighbor frequencies corresponding to current neighbor cells of a neighbor RAT;
   determining whether a cell identification for the serving cell and a stored serving cell identification of a previous serving cell are matched, the previous serving cell associated with previous neighbor frequencies corresponding to previous neighbor cells, the previous neighbor cells associated with previously recorded types of redirection results;
   evaluating the list of current neighbor frequencies to determine whether each current neighbor cell matches a previous neighbor cell; and
   determining current neighbor cells for power scan and/or synchronization channel decoding procedures to select one of the current neighbor cells to redirect a UE (user equipment) based at least in part on the previously recorded types of redirection results.

2. The method of claim 1, further comprising performing the synchronization channel decoding procedures for each current neighbor cell having a signal quality above a first threshold, after scanning frequencies of the current neighbor cells according to the power scan.

3. The method of claim 2, further comprising redirecting to a selected current neighbor cell when a signal quality of the selected current neighbor cell is above a second threshold, after performing the synchronization channel decoding procedures.

4. The method of claim 1, in which the evaluating further comprises determining whether a location of the UE and a location associated with a matching previous cell stored in the UE are matched, and only identifying a previously recorded type of redirection results for the matching previous cell when the location of the UE and the location associated with the matching previous cell stored in the UE are matched.

5. The method of claim 1, in which the previously recorded types of redirection results include an unsuccessful redirection, a successful redirection with location area update and a successful redirection without location area update.

6. The method of claim 5, further comprising:
   scanning a first set of neighbor cells corresponding to a first type of redirection result according to the power scan; and
   scanning a second set of neighbor cells corresponding to a second type of redirection result when a signal quality of each cell of the first set of neighbor cells is below a predetermined signal quality.

7. The method of claim 6, in which scanning the second set of neighbor cells occurs after performing synchronization channel decoding of the first set of neighbor cells when a signal quality of each cell of the first set of neighbor cells is determined to be below the predetermined signal quality.

8. The method of claim 1, further comprising selecting neighbor cells, not found in the list of current neighbor frequencies, for power scan and synchronization channel decoding procedures when all the current neighbor cells matching the previous neighbor cells have a signal quality below a first threshold.

9. The method of claim 1, further comprising selecting at least one of the current neighbor cells matching a previous neighbor cell and having signal quality below a first threshold before selecting neighbor cells that are not on the list of current neighbor frequencies when the signal quality of the selected at least one of the current neighbor cells is below a first threshold.

10. The method of claim 1, further comprising selecting neighbor cells, not found in the list of current neighbor frequencies, for power scanning and synchronization channel decoding procedures when no matching neighbor cells are found.

11. An apparatus for wireless communication, comprising:
   means for receiving a redirection command from a serving cell of a serving RAT (radio access technology), the redirection command including a list of current neighbor frequencies corresponding to current neighbor cells of a neighbor RAT;
   means for determining whether a cell identification for the serving cell and a stored serving cell identification of a previous serving cell are matched, the previous serving cell associated with previous neighbor frequencies corresponding to previous neighbor cells, the previous neighbor cells associated with previously recorded types of redirection results;
   means for evaluating the list of current neighbor frequencies to determine whether each current neighbor cell matches a previous neighbor cell; and
   means for determining current neighbor cells for power scan and/or synchronization channel decoding procedures to select one of the current neighbor cells to redirect a UE (user equipment) based at least in part on the previously recorded types of redirection results.

12. The apparatus of claim 11, further comprising means for performing the synchronization channel decoding procedures for each current neighbor cell having a signal quality above a first threshold, after scanning frequencies of the current neighbor cells according to the power scan.

13. The apparatus of claim 12, further comprising means for redirecting to a selected current neighbor cell when a signal quality of the selected current neighbor cell is above a second threshold, after performing the synchronization channel decoding procedures.

14. The apparatus of claim 11, in which the evaluating means further comprises means for determining whether a location of the UE and a location associated with a matching previous cell stored in the UE are matched, and means for only identifying a previously recorded type of redirection results for the matching previous cell when the location of the UE and the location associated with the matching previous cell stored in the UE are matched.

15. The apparatus of claim 11, in which the previously recorded types of redirection results include an unsuccessful redirection, a successful redirection with location area update and a successful redirection without location area update.

16. An apparatus for wireless communication, comprising:

a memory;
a transceiver configured for wireless communication; and
at least one processor coupled to the memory and the transceiver, the at least one processor configured:
- to receive a redirection command from a serving cell of a serving RAT (radio access technology), the redirection command including a list of current neighbor frequencies corresponding to current neighbor cells of a neighbor RAT;
- to determine whether a cell identification for the serving cell and a stored serving cell identification of a previous serving cell are matched, the previous serving cell associated with previous neighbor frequencies corresponding to previous neighbor cells, the previous neighbor cells associated with previously recorded types of redirection results;
- to evaluate the list of current neighbor frequencies to determine whether each current neighbor cell matches a previous neighbor cell; and
- to determine current neighbor cells for power scan and/or synchronization channel decoding procedures to select one of the current neighbor cells to redirect a UE (user equipment) based at least in part on the previously recorded types of redirection results.

17. The apparatus of claim 16, in which the at least one processor is further configured to perform the synchronization channel decoding procedures for each current neighbor cell having a signal quality above a first threshold, after scanning frequencies of the current neighbor cells according to the power scan.

18. The apparatus of claim 17, in which the at least one processor is further configured to redirect to a selected current neighbor cell when a signal quality of the selected current neighbor cell is above a second threshold, after performing the synchronization channel decoding procedures.

19. The apparatus of claim 16, in which the at least one processor is further configured to evaluate by determining whether a location of the UE and a location associated with a matching previous cell stored in the UE are matched, and by only identifying a previously recorded type of redirection results for the matching previous cell when the location of the UE and the location associated with the matching previous cell stored in the UE are matched.

20. The apparatus of claim 16, in which the previously recorded types of redirection results include an unsuccessful redirection, a successful redirection with location area update and a successful redirection without location area update.

21. The apparatus of claim 20, in which the at least one processor is further configured:
- to scan a first set of neighbor cells corresponding to a first type of redirection result according to the power scan; and
- to scan a second set of neighbor cells corresponding to a second type of redirection result when a signal quality of each cell of the first set of neighbor cells is below a predetermined signal quality.

22. The apparatus of claim 21, in which the scanning the second set of neighbor cells occurs after performing synchronization channel decoding of the first set of neighbor cells when a signal quality of each cell of the first set of neighbor cells is determined to be below the predetermined signal quality.

23. The apparatus of claim 16, in which the at least one processor is further configured to select neighbor cells, not found in the list of current neighbor frequencies, for power scan and synchronization channel decoding procedures when all the current neighbor cells matching the previous neighbor cells have a signal quality below a first threshold.

24. The apparatus of claim 16, in which the at least one processor is further configured to select at least one of the current neighbor cells matching a previous neighbor cell and having signal quality below a first threshold before selecting neighbor cells that are not on the list of current neighbor frequencies when the signal quality of the selected at least one of the current neighbor cells is below a first threshold.

25. The apparatus of claim 16, in which the at least one processor is further configured to select neighbor cells, not found in the list of current neighbor frequencies, for power scanning and synchronization channel decoding procedures when no matching neighbor cells are found.

26. A non-transitory computer-readable medium having non-transitory program code recorded thereon, the program code comprising:
- program code to receive a redirection command from a serving cell of a serving RAT (radio access technology), the redirection command including a list of current neighbor frequencies corresponding to current neighbor cells of a neighbor RAT;
- program code to determine whether a cell identification for the serving cell and a stored serving cell identification of a previous serving cell are matched, the previous serving cell associated with previous neighbor frequencies corresponding to previous neighbor cells, the previous neighbor cells associated with previously recorded types of redirection results;
- program code to evaluate the list of current neighbor frequencies to determine whether each current neighbor cell matches a previous neighbor cell; and
- program code to determine current neighbor cells for power scan and/or synchronization channel decoding procedures to select one of the current neighbor cells to redirect a UE (user equipment) based at least in part on the previously recorded types of redirection results.

* * * * *